Patented Oct. 31, 1922.

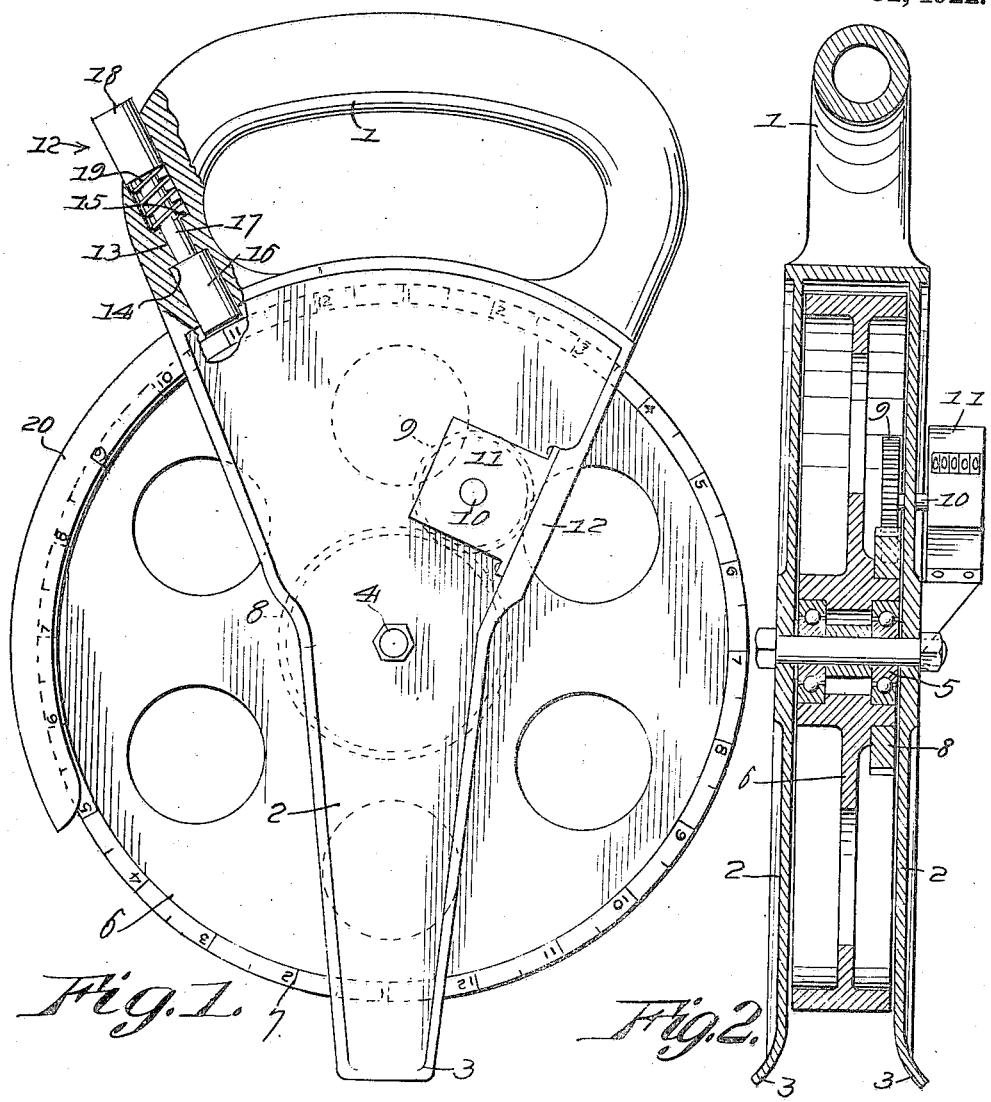
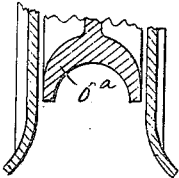

1,433,757

UNITED STATES PATENT OFFICE.

LEWIS P. THATCHER, OF CHATTANOOGA, TENNESSEE.

MEASURING DEVICE.

Application filed February 12, 1921. Serial No. 444,407.

*To all whom it may concern:*

Be it known that I, LEWIS P. THATCHER, a citizen of the United States, residing at Chattanooga, in the county of Hamilton and State of Tennessee, have invented certain new and useful Improvements in Measuring Devices, of which the following is a specification.

This invention relates to improvements in measuring devices and it is particularly designed for measuring a rope, cable or pipe that is being lowered into or raised from a well. While the device was particularly devised for the foregoing purpose it is obvious that its use is not limited to this particular application as the device may be used for measuring other things of a like nature.

The primary object of the invention is to furnish a measuring device which will accurately measure and indicate the length of cord, cable, pipe or the like which has passed in contact with my improved device.

Another object of the invention is to provide a hand operated braking device constructed to prevent overrunning of the measuring wheel.

Another object of the invention is to furnish a measuring device which will accurately indicate the number in feet and inches of a cord, cable, pipe or the like which has passed a measuring device.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawing:—

Figure 1 is a side view partly in section of my improved measuring device.

Fig. 2 is a sectional view of the same.

Fig. 3 is a detail sectional view of a modification.

In the drawing, 1 designates a handle which is preferably of tubular construction as shown in Fig. 2 and carries two parallel arms 2 which terminate in outwardly extending end portions 3.

A suitable shaft such as a bolt and nut construction 4, connects the arms together and mounted on this shaft is a suitable bearing 5 which carries the measuring wheel 6.

The measuring wheel in the construction illustrated is provided with a substantially cylindrical periphery and its side edge near the periphery is graduated in inches as shown to form the scales 7. These scales may be graduated or calibrated to measure fractions of inches or larger amounts and in the construction illustrated the periphery of the wheel 6 has a circumference of two feet so that the scale is marked off to measure two feet for each revolution of the wheel. Mounted on the hub of the wheel and fixed thereto is a large gear 8 which meshes with a smaller gear 9 that is mounted on a shaft 10 which actuates suitable counting mechanism, such as an odometer 11, which is mounted on a flange or ledge 12 carried by one of the arms 2.

When the device is to be used for measuring a cable or pipe being lowered into or raised from a well, the operator holds the point of the wheel which is arranged between the ends 3, against the moving cable or pipe and this causes the wheel 6 to rotate. As the wheel rotates it operates the odometer 11 and the length of cable or pipe passing a fixed point will be indicated by the odometer and by the scale 7. It is particularly desirable to employ the scale in connection with the odometer for this enables the operator to ascertain the number of feet and inches of cable or pipe which has passed the measuring device. If this scale were not employed an odometer registering inches would have to be used in order to obtain accurate results and as such an odometer is expensive to manufacture, I eliminate the necessity of employing such complicated mechanism and the expense incident thereto.

It is obvious that the device might be supported by a tripod or the like in order to relieve the operator of supporting the device and holding the same against the cable or pipe.

In order to prevent overrunning or too rapid rotation of the wheel 6, and in order to stop the wheel at any fixed point, I have provided the braking mechanism 12. To accommodate this braking mechanism the handle 1 is provided with a bore 13 that is arranged radially relatively to the wheel and is provided with two shoulders 14 and 15. Mounted in this bore is a brake shoe 16 whose outward movement is limited by the shoulder 14. The shoe is provided with a stem 17 and a thumb engaging head 18. A coiled spring 19 is arranged in the bore between the shoulder 15 and the head 18 and functions to normally maintain the shoe out of contact with the periphery of the wheel 6. When it is desired to use the brake the operator presses the thumb piece 18 and this forces the shoe into contact with the periphery of the wheel and halts the same.

An arc-shaped guard 20 is fixed to the handle to prevent the operator's hand from contacting with the periphery of the measuring wheel.

It is obvious that the periphery of the wheel may be grooved instead of cylindrical and this I have shown at 6ª in Fig. 3.

I am aware that various changes and modifications may be made in the construction shown without departing from the spirit of the invention or sacrificing any of its advantages.

What I claim and desire to secure by Letters-Patent is:

1. A measuring device for measuring a rope or the like being lowered into or raised from a well, comprising a wheel adapted to engage the rope being measured, a shaft on which said wheel is mounted, a plurality of parallel arms connected to said shaft and extending diametrically across said wheel, a handle secured to one end of said arms, the other ends of said arms extending beyond the periphery of said wheel and forming a rope guide for use in keeping the wheel in engagement with said rope, and a recording meter carried by one of said arms and actuated by said wheel.

2. A measuring device of the kind defined by claim 1 in which a circular scale is located on one side of the wheel adjacent its periphery.

3. A measuring device of the kind defined by claim 1 in which a thumb-controlled brake is carried by the handle and engages the periphery of the wheel.

4. A measuring device comprising a handle carrying parallel arms terminating in oppositely extending end portions, a shaft connecting said arms, a rotatable measuring wheel mounted on said shaft between the arms, the end portion of said arms projecting beyond the periphery of said wheel and forming rope guides, a circular scale provided on one side of the wheel adjacent its periphery, a gear fixed to the hub of said wheel, a smaller gear driven by the first mentioned gear, and a recording meter carried by one of said arms and driven by the smaller gear and designed to cooperate with the scale for indicating the amount of movement of the periphery of said wheel.

5. A measuring device including a wheel adapted to engage a rope or the like being measured, a shaft for said wheel, supporting means for said shaft, a handle connected to said supporting means, said handle being provided with a bore arranged radially relatively to said shaft and provided with a plurality of internal shoulders, a brake shoe slidably mounted in said bore, designed to engage the periphery of the wheel and having its movement in one direction limited by one of said shoulders, a stem and head carried by said shoe, and a spring arranged between the other shoulder and said head for normally maintaining the shoe out of contact with the periphery of the measuring wheel.

6. A device for measuring a rope or the like being lowered into or raised from a well, comprising a shaft, a measuring wheel mounted on said shaft and adapted to engage the rope being measured, arms extending diametrically across the opposite sides of said wheel and carrying said shaft, one end of one of said arms projecting beyond the periphery of said wheel and forming a guide for use in maintaining said wheel in contact with the rope or the like being measured, a recording meter carried by one of said arms and driven by said wheel, a supporting member for said arms, a brake mounted in the supporting member and adapted to engage said wheel, and a scale arranged on one side of said wheel adjacent its periphery.

In testimony whereof I affix my signature.

LEWIS P. THATCHER.